(No Model.)
H. T. SHRIVER.
ANTI FRICTION BEARING.
No. 459,877. Patented Sept. 22, 1891.
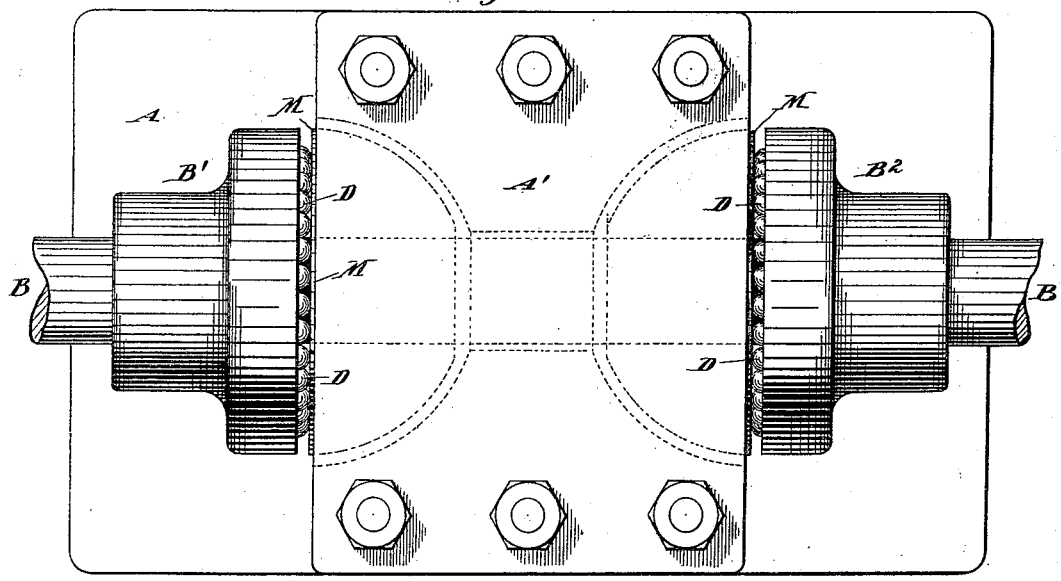
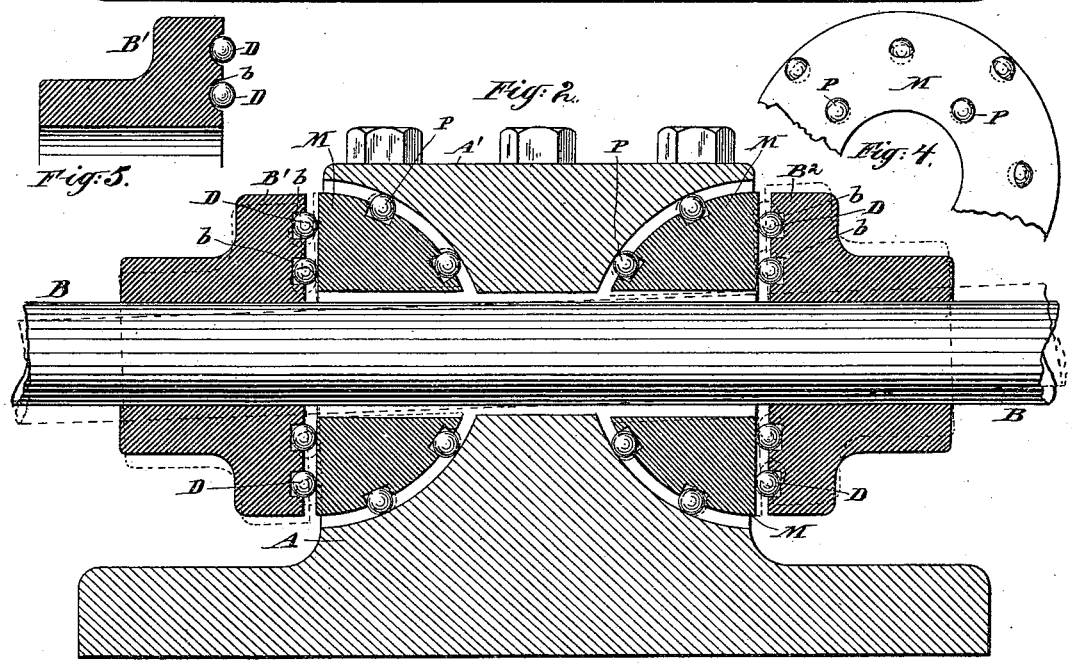
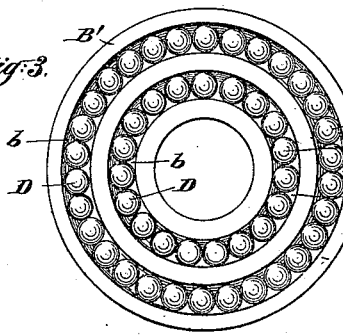
Witnesses:
Charles R. Searle
M. F. Boyle
Inventor:
Harry T. Shriver
by his attorneys
Thomas Drew Stetson
THE NORRIS PETERS CO., PHOTO-LITHO., WASHINGTON, D. C.

UNITED STATES PATENT OFFICE.

HARRY T. SHRIVER, OF NEW YORK, N. Y.

ANTI-FRICTION BEARING.

SPECIFICATION forming part of Letters Patent No. 459,877, dated September 22, 1891.

Application filed June 27, 1891. Serial No. 397,731. (No model.)

*To all whom it may concern:*

Be it known that I, HARRY T. SHRIVER, a citizen of the United States, residing in the city and county of New York, and State of New York, have invented a certain new and useful Improvement in Anti-Friction Bearings, of which the following is a specification.

My improvement is adapted to serve with the shafts of grist-mills and other vertical, horizontal, or inclined shafts in any situations or for any purpose, revolving slowly or rapidly and exposed to end-thrust. I will describe it as applied to the shaft of a screw-steamer. Freely-rolling balls traversed around in grooves of nearly corresponding cross-section are efficient anti-friction devices and are peculiarly free from liability to derangement. Refinements in manufacture have rendered it practicable to produce steel balls which are very perfect spheres and of very nearly uniform size. Such balls, either hardened or not, are capable of resisting great strains, so that a proper number of such balls distributed in a series following each other around the shaft, the balls being properly retained in a groove in a collar on the shaft, will carry a heavy end-thrust at any ordinary velocity of rotation with almost inappreciable loss of power from friction and with little wear either of the balls or of the grooves in which they are traversed; but there is a liability to unequal bearing at different points, due to imperfect workmanship or adjustment or to wear, which goes far to discourage the use of this form of anti-friction bearing.

My invention overcomes this difficulty. I provide a separate bearing-piece capable of rocking within sufficient limits to allow for the slight inequalities developed. I make two circular grooves in the collar, one of less diameter and arranged concentrically within the other, with a series of balls in each, and make the bearing-piece with a sufficiently-broad bearing-surface to carry them. When the engine is reversed, the shaft is urged endwise in the direction opposite to the usual one, I provide for resisting the thrusting force in both directions.

The accompanying drawings form a part of this specification and represent what I consider the best means of carrying out the invention.

Figure 1 is a plan or top view of the bearing. Fig. 2 is a central vertical section of the same. Fig. 3 is a face view of one of the collars. Fig. 4 is an elevation showing a portion of one of the hemispherical rings. Fig. 5 is a vertical section of a portion, showing a modification.

Similar letters of reference indicate corresponding parts in all the figures where they appear.

A is the pillow-block or body of the bearing, firmly bolted or otherwise secured to the hull of the vessel. (Not shown.) It is in two parts, the upper part or binder $A'$ being removable to allow the introduction and removal of the shaft. The pillow-block and binder are formed with a hemispherical socket on each end, as will presently appear.

B is the shaft, and $B'$ $B^2$ are sufficiently-broad collars thereon. These collars may be forged in one with the shaft, or may be welded or otherwise rigidly attached. The surfaces of the collars $B'$ $B^2$ which are presented toward the bearing are nicely finished in a lathe and each provided with two circular grooves $b\ b$, each exactly concentric to the axis of motion, large enough to receive the balls loosely.

D D are steel balls inclosed in the circular grooves and allowed to traverse around therein. Instead of making the bearings against which these balls are pressed directly on the rigidly-held pillow-block A and binder $A'$, the faces of the bearing are formed in hemispherical rings M, fitted by the aid of anti-friction balls P in the hemispherical sockets therein, so as to allow the easy rocking of the bearings. The extent of such rocking motion is slight, but sufficient to contribute greatly to the successful working of the other and main sets of anti-friction balls.

The series of balls P between the hemispherical ring M and the pillow-block A and binder $A'$ are required to turn but very slightly, and that in the direction to accommodate the rolling or oscillating motion only. In practice I simply sink the balls into recesses formed in the rocking bearing, having a little less depth and a little greater area than a ball P. These balls may be smaller or larger than the balls D.

The hemispherical rings M may be made in two parts, with sufficient dowels or analogous devices to hold them matched together in the exactly correct positions, and with bolts with sunk heads and nuts or other devices for holding them together. It will be observed that there is no strain tending to separate them.

Other modifications may be made without departing from the principle or sacrificing the advantages of the invention. I can make the grooves $b$ of nearly semicircular cross-section instead of the rectangular cross-section shown. Fig. 5 shows such a modification. I can groove the rocking bearing-piece or hemispherical rings M and leave the collars B with plane faces, or I can sink the grooves partly in each.

I can use my hemispherical rocking ring on one end only of the pillow-block—that which receives the thrust in the going-ahead motion of the vessel—and employ an ordinary collar or a series of such collars to receive the thrust during the relatively brief periods that the propeller-shaft is turned backward and the thrust is in the opposite direction.

Instead of making the pillow-block and binder in two pieces, the whole can be made in one and the shaft inserted and removed by an endwise motion.

I claim as my invention—

1. In anti-friction devices for receiving thrusting strains, the shaft B, circumferentially-grooved collar B', and balls D, in combination with an adjacent bearing-piece M, having its outer surface a portion of a sphere, a pillow-block A and binder A', having a spheroidal cavity, and a series of anti-friction balls P, mounted between the pillow-block and the bearing-piece to facilitate the rocking, all substantially as herein specified.

2. In anti-friction devices for receiving thrusting strains, the fixed support A A', having two concaves, two corresponding oppositely-faced bearing-pieces M M, with anti-friction balls arranged between them to facilitate their rocking, in combination with each other and with the shaft B, two oppositely-faced collars B' B², and anti-friction balls D, running in grooves between each collar and its associated bearing-piece, all arranged for joint operation as herein specified.

In testimony that I claim the invention above set forth I affix my signature in presence of two witnesses.

HARRY T. SHRIVER.

Witnesses:
THOMAS DREW STETSON,
M. F. BOYLE.